United States Patent
Liu (10) Patent No.: US 7,417,955 B2
(45) Date of Patent: Aug. 26, 2008

(54) METHOD OF TUNING PROCESS FOR WLAN DEVICES

(75) Inventor: I-Ru Liu, Taipei (TW)

(73) Assignee: Arcadyan Technology Corporation, Hsinchu (TW)

( * ) Notice: Subject to any disclaimer, the term of this patent is extended or adjusted under 35 U.S.C. 154(b) by 418 days.

(21) Appl. No.: 11/318,493

(22) Filed: Dec. 28, 2005

(65) Prior Publication Data

US 2007/0053305 A1    Mar. 8, 2007

(30) Foreign Application Priority Data

Sep. 2, 2005    (TW) .............................. 94130155 A (51) Int. Cl.
*G01R 31/08* (2006.01)

(52) U.S. Cl. .................. 370/251; 370/252; 370/31.2; 370/332; 370/333

(58) Field of Classification Search ......... 370/252–253, 370/310–350
See application file for complete search history.

(56) References Cited

U.S. PATENT DOCUMENTS

| | | | |
|---|---|---|---|
| 6,553,229 B1 * | 4/2003 | Dent | 455/434 |
| 2003/0181211 A1 * | 9/2003 | Razavilar et al. | 455/450 |

* cited by examiner

*Primary Examiner*—Duc Nguyen
*Assistant Examiner*—Dai A Phuong
(74) *Attorney, Agent, or Firm*—Birch, Stewart, Kolasch & Birch, LLP (57) ABSTRACT

A method of a tuning process for WLAN devices is to select test channels of the DUT (device under test) by utilizing the method of random sampling or sequence. Besides, the method obtains a parameter average by averaging the parameters of the already tested channels (or further includes the current test channel) of the DUT in a batch method or a recursive method. The parameter average is provided for tuning the non-tested channels of the DUT or the channel under test of the DUT.

25 Claims, 7 Drawing Sheets

METHOD OF TUNING PROCESS FOR WLAN DEVICES

BACKGROUND OF THE INVENTION

1. Field of Invention

The invention relates to a WLAN (wireless local area network) and, in particular, to a method of a tuning process of WLAN devices.

2. Related Art

Accompanying with the development of wireless transmission industry, various kinds of devices and technologies applied to multiple frequency transmission are invented. The WLAN device utilizes multiple frequency channels for receiving or transmitting signals. Unfortunately, the variants between the receiving system and the transmitting system having radio and analog modules of different components cause the different channel characteristics. To identify the characteristics of the multiple frequency channels and to eliminate the distortion of the received or transmitted signals, the tuning process for the WLAN device must test the channels and generate the optimum parameter(s) for setting. The WLAN device has various kinds of parameter observations and parameter settings such as the error vector magnitudes (EVM) or the sidelobe levels of the measured signals for tuning the transmit-powers of different channels, or the packet error rate (PER) of the measured signals for tuning the receive-powers of different channels. Regarding to the device utilizing IEEE 802.11 (WLAN/WiFi), IEEE 802.16 (may be named as WMAN/WiMAX), IEEE 802.15.3a (WPAN/UWB), or IEEE 802.20 (WWAN/MBWA), both the architectures of multiple frequency channels in a single antenna/radio and in multiple antennas/radios (MIMO or Multiple-Input-and-Multiple-Output systems as per IEEE 802.11n and other related standards) must to test and to tune the different channels or the different antennas/radios so as to ensure the production yield of the WLAN devices.

In the early days, the WLAN devices are tuned one by one. In more detailed, the channels of each WLAN device are tested and tuned by turn. According to the progress of the related technologies, the customers have more and more requirements and the environment for wireless transmission becomes more complex. In the complex environment for wireless transmission, the WLAN devices must have more usable channels, which results in that to tune the WLAN devices one by one takes longer testing time. In other words, since the channels of the WLAN device are increased and the tuning speed for a single channel is the same, the production time for the WLAN devices grows. To speed the tuning process for the WLAN devices, the tuning process with the normalized settings is adopted. In this case, some channels of several WLAN devices are tested to tune the transmit-power and receive-power to reach the minimum EVM, minimum sidelobe levels, or minimum PER so as to obtain the parameter setting values for most channels of most WLAN devices. Alternatively, to reduce the testing time, the parameters obtained in the product developing stage can be used as the parameter setting values in the mass production stage.

As mentioned above, the tuning process with the normalized settings can shorten the testing time of the WLAN devices. However, this method uses the only normalized setting for each parameter setting, so that the identification of the multiple frequency channels may not be maintained and the distortion in receiving signals or transmitting signals may not be eliminated. To consider with the testing speed and the device quality both, the tuning process by utilizing means or arithmetic means are disclosed. In this method, a front channel, a middle channel and a rear channel are tested. For all channels between the front channel and the middle channel, the median or the average of the parameters for the front and middle channels is used as the parameter calibration value for tuning all of the channels between the front and middle channels or for tuning the arithmetic mean channels. Similarly, for all channels between the middle channel and the rear channel, the median or the average of the parameters for the middle and rear channels is used as the parameter calibration value for tuning all of the channels between the middle and rear channels or for tuning the arithmetic mean channels. Regarding to the current situation in Taiwan, the WLAN (in the case of IEEE802.11b/g) devices use channels 1 to 11. In this case, the tuning process by utilizing means or arithmetic means is to obtain the parameters of channel 1, channel 6 and channel 11 in advance. Then, the average of the parameters of channels 1 and 6 is calculated to be the parameter of channel 3 or channel 4 or to be the parameters of channels 2 to 5. As the same manner, the average of the parameters of channels 6 and 11 is calculated to be the parameter of channel 8 or channel 9 or to be the parameters of channels 7 to 10. The tuning process by utilizing means or arithmetic means is to test some predetermined channels in each WLAN device. In other words, this method uses only two or three parameters to determine the parameter calibration value for all channels of a single WLAN device. However, regarding to the WLAN devices, the improvement of the quality for each channel is limited.

It is therefore an important subject of the invention to provide a method of a tuning process for WLAN devices, which can tune multiple frequency channels efficiently and accurately, improve the transmit maximum power or more while decreasing the EVM and sidelobe levels, and enhance the receive sensibility while decreasing the PER

SUMMARY OF THE INVENTION

In view of the foregoing, the invention is to provide a method of a tuning process for WLAN devices, which can decrease the test time for the WLAN devices with multiple channels.

In addition, the invention is to provide a method of a tuning process for WLAN devices, which can increase the accuracy of the tuned channel parameter settings of the WLAN devices. For decreasing the production cost, the radio frequency and analog components in the receive/transmit system of the WLAN device are usually made of cheaper materials and the performances thereof are driven up to the maximum limitations. Besides, the quality of the components is usually carelessly controlled, so that the characteristics of the components deviate. Moreover, since the number of the channels is plenty and the bandwidth of the channels is broad, the characteristic variability between the channels of the WLAN devices is much obvious than that of the narrow bandwidth or single channel device. In addition, the amount of the adopted radio frequency and analog components is huge, so the characteristic parameters and the tuning parameters of each channel are usually in random distribution. In the invention, the randomly sampling and statistics theory are combined to develop the precise method of the tuning process for testing and tuning the complex WLAN devices. With utilizing the method of the invention, the yield rate can be efficiently improved and the manufacturing process can be speeded.

Regarding to one aspect of the invention, a method of a tuning process for WLAN devices is to randomly select some channels of each WLAN device for the test or to select some certain channels of each WLAN device for the test. In this case, the certain channels are obtained in advance by a random sampling method. Then, the parameters of the already tested channels are averaged by utilizing a batch method or a recursive method, so that each channel has a corresponding parameter mean. In each DUT (device under test), the parameter means of all selected channels are averaged to obtain a parameter calibration value for the channels. Finally, the non-tested WLAN devices are tuned according to the parameter calibration value.

Regarding to another aspect of the invention, a method of a tuning process for WLAN devices is to test all channels of each WLAN device in sequence. After testing one channel, the parameters of the channels of already tested WLAN devices are averaged immediately to obtain a parameter calibration value for the just tested channel.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

The invention is characterized in randomly selecting channels of a lot of WLAN devices for the test so as to obtain the parameters of the channels and then averaging the parameters of the channels to obtain a parameter calibration value by a statistic method. As mentioned above, the invention utilizes statistic method such as a sample mean method or an optimum linear estimation method in cooperation with a batch method or a recursive method to carry out the averaging step. In the invention, the batch method is to sum up the parameters of all test channels and then divide the sum by the number of channels. In addition, the recursive method can be taught based on the batch method. The recursive method is to average the parameters of several test channels and then arithmetically calculate the parameter of the next channel.

Figure 1:
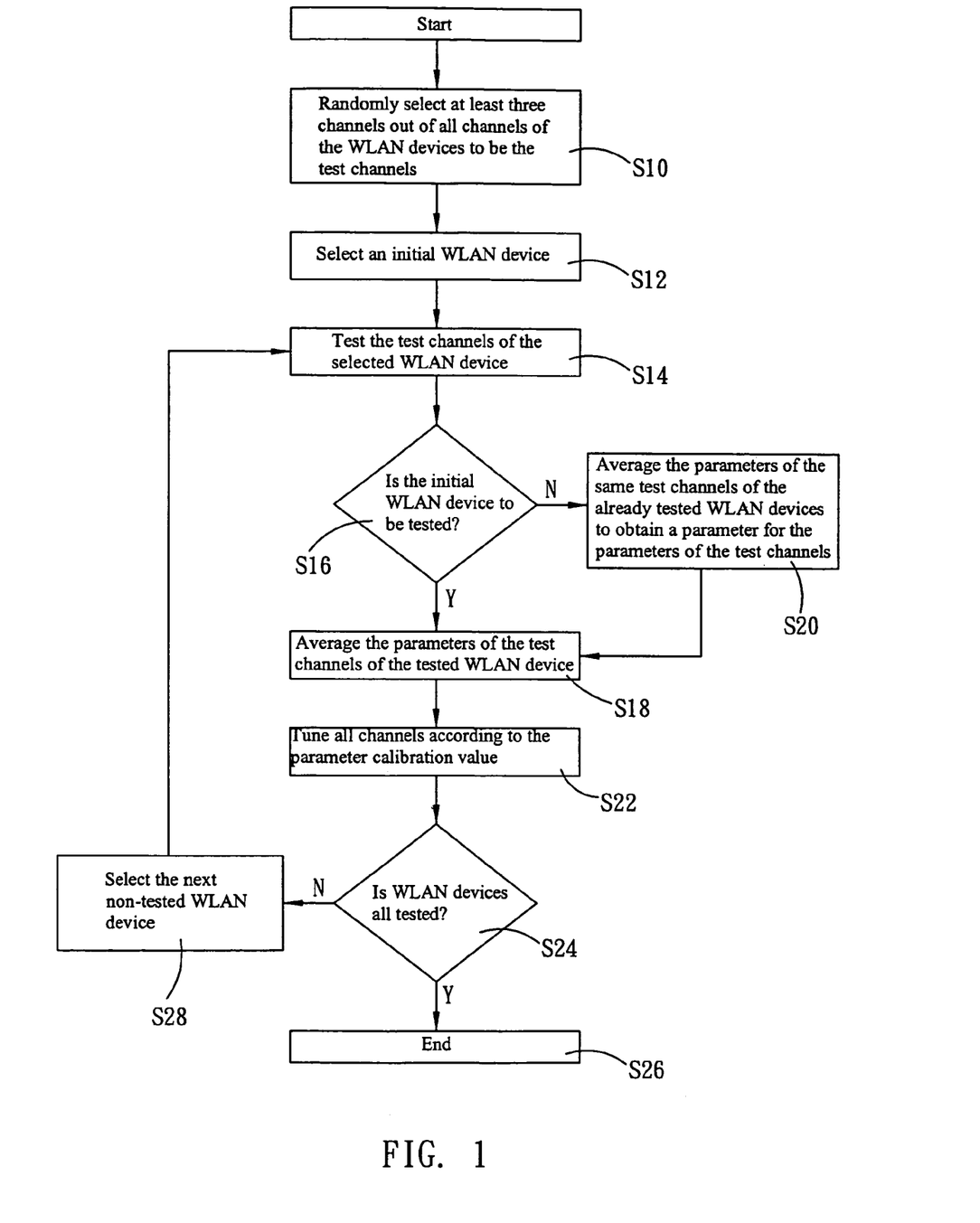
FIG. 1 is flow chart showing a method of a tuning process for WLAN devices according to a first embodiment of the invention.

FIG. 1 is flow chart showing a method of a tuning process for WLAN devices. The method utilizes the sample mean method or optimum linear estimation method in cooperation with the batch method or recursive method. The parameters of the same channel in different WLAN devices are calculated by the sample mean method or the optimum linear estimation method to obtain an average of the channel. A parameter calibration value of the same WLAN device is obtained by averaging the parameters of test channels with a batch method or a recursive method.

In step S10, at least three channels, which serve as the test channels, are randomly selected out of all channels of the WLAN devices. The randomly selected channels include a first channel, a second channel and a third channel. For example, there are 11 channels in one lot of WLAN devices. The channels No. 2, No. 9 and No. 10 are randomly selected out of the 11 channels. Herein, the channels No. 2, No. 9 and No. 10 are respectively the first channel, the second channel and the third channel. Each of the WLAN devices is tested about the channels No. 2, No. 9 and No. 10 according to the randomly selecting result. An initial WLAN device is firstly selected for the initial testing. For instance, if the lot of WLAN devices includes 1,000 WLAN devices, any one of the 1,000 WLAN devices may be selected to be the initial WLAN device, which is initially tuned (step S12).

The first, second and third channels of the selected initial WLAN device are tested to obtain parameters of the first, second and third channels (step S14). For example, the transmit-powers and the corresponding EVM and sidelobe levels of the channels No. 2, No. 9 and No. 10 referring to the initial WLAN device or other WLAN device of the lot of WLAN devices are tested. Them, step S16 is to determine whether the DUT is the initial WLAN device, which is the firstly tested WLAN device of the lot of WLAN devices, or not.

If the DUT is the initial WLAN device, the parameters of the test channels of the initial WLAN device are averaged to obtain a parameter calibration value for all channels of the initial WLAN device (step S118). For example, the parameter average, which is calculated by averaging the parameter of the transmit-powers and the corresponding EVM and sidelobe levels of the channels No. 2, No. 9 and No. 10 in the initial WLAN device, is used to be the parameter calibration value for all channels of the initial WLAN device. In this embodiment, the step S118 can be processed by utilizing a batch method or a recursive method.

If the DUT is a current DUT, which is not the initial WLAN device, the parameters of the same test channels of the already tested WLAN devices are averaged to obtain a parameter for replacing the parameters of the current DUT (step S20). In other words, the step S20 is to generate averages of the test channels according to the already test WLAN devices. For example, if 27 WLAN devices of the lot are tested for retrieving the parameter of the transmit-powers and the corresponding EVM and sidelobe levels of the test channels No. 2, No. 9 and No. 10, the parameters of the channel No. 2 in the 27 WLAN devices are averaged. Similarly, the parameters of the channels No. 9 and No. 10 in the 27 WLAN devices are respectively averaged. After the step S20, step 18 is performed to average the parameters of the test channels to obtain the parameter calibration value for all channels of the 27th WLAN device.

According to the steps S18 and S20, the parameter calibration value can be calculated. Regarding to the initial WLAN device, the parameter calibration value of the initial WLAN device is used to tune all channels of the initial WLAN device. Regarding to the current DUT, the parameter calibration value of the current WLAN device is used to tune all channels of the current WLAN device (step S22). Then, step S24 is to determine whether the lot of WLAN devices is all tested or not. If the lot of WLAN devices is all tested, the tuning process is ended (step S26).

If the lot of WLAN devices is not all tested, the next non-tested WLAN device is selected (step S28). After that, the step S14 to step S24 are repeated until all WLAN devices in the lot are tested.

In the step S20, the parameters of the same test channels of the already tested WLAN devices can be averaged by utilizing a sample mean method or an optimum linear estimation method. In this case, the mean error of the sample mean method is very small and thus can be omitted. Since the amount of WLAN devices in one lot is usually hundreds or thousands, the parameter average of the test channels obtained according to a reference number of WLAN devices can directly represent the parameter of the same channel in different WLAN devices. Thus, it is unnecessary to average the parameters of all WLAN devices. In the embodiment, the reference number is usually decades. For example, if the channels No. 2, No. 9 and No. 10 of 30 WLAN devices are tested, the parameter averages of the channel No. 2, No. 9 and No. 10 can represent the parameters of the channel No. 2, No. 9 and No. 10 in all WLAN devices because the mean error in the sample mean method is small. In one WLAN device, the parameter calibration value of all channels can be fixed. Therefore, the step S22 can tune the channels of all WLAN devices according to the fixed parameter calibration value. In the current embodiment, the reference number can be adjusted according to actual needs. Since the components, tools, arts, and environment are more or less correlating to each other in the manufacturing processes, the reference number should be determined based on these vectors. If the reference number is too less, the test result may not represent all of the WLAN devices. If the reference is too large, the mean error may not be improved and the production speed will be decreased. In practice, the reference number may be increased to the average of the total number in the lot for the default optimum number in the next lot.

The coefficients used in the optimum linear estimation method are the function of the history statistic parameters and are approached by an estimation error and estimation orthogonal method, so that the parameter average may reach the minimum mean square error. The history statistic parameters are also called the prior-knowledge, which includes the statistic values, such as the mean, variance, autocorrelation, and crosscorrelation, of the parameters of the channels in the already tested WLAN devices. The prior-knowledge can be obtained according to few precise engineering test results and mathematical analyzes. If the prior-knowledge is more sufficient and more correct, the accuracy of the optimum linear estimation method is much higher. In other words, the mean square error is lower.

Figure 2:
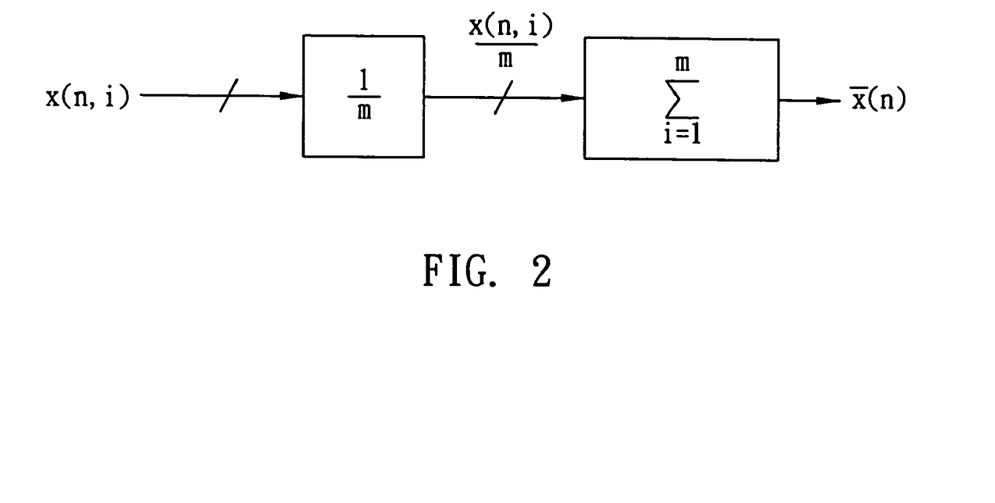
FIG. 2 is a schematic illustration showing a practice of a batch form sample mean method.

FIG. 2 is a schematic illustration showing a practice of a batch form sample mean method. The batch form sample mean $\bar{x}(n)$ is:

$$\bar{x}(n) = \sum_{i=1}^{m} \frac{x(n, i)}{m} \tag{EQ-1}$$

wherein, m is the total number of test channels, i is the test channel, x(n, i) is the parameter of the test channel, and n is the current DUT. In one lot of WLAN devices, a certain number of WLAN devices are selected for the test by utilizing the sample mean method. If the mean error is insufficient to affect the accuracy of the channels, the batch form sample mean $\bar{x}(n)$ can represent the parameters of the same channels in different WLAN devices.

Figure 3A:
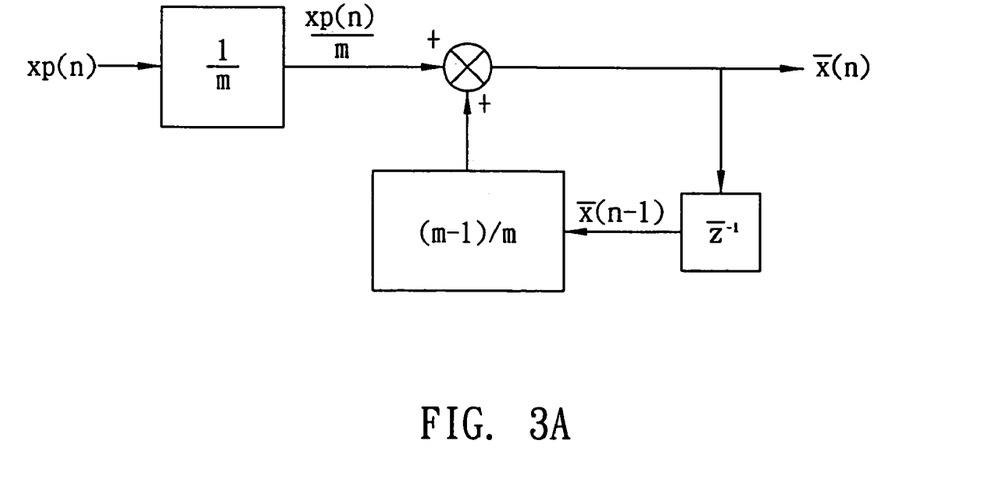
FIGS. 3A to 3C are schematic illustrations showing a practice of a recursive form sample mean method.
Figure 3B:
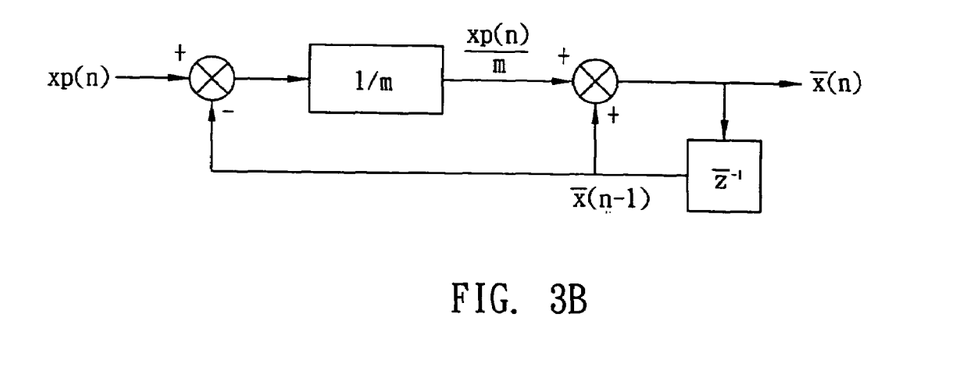
Figure 3C:
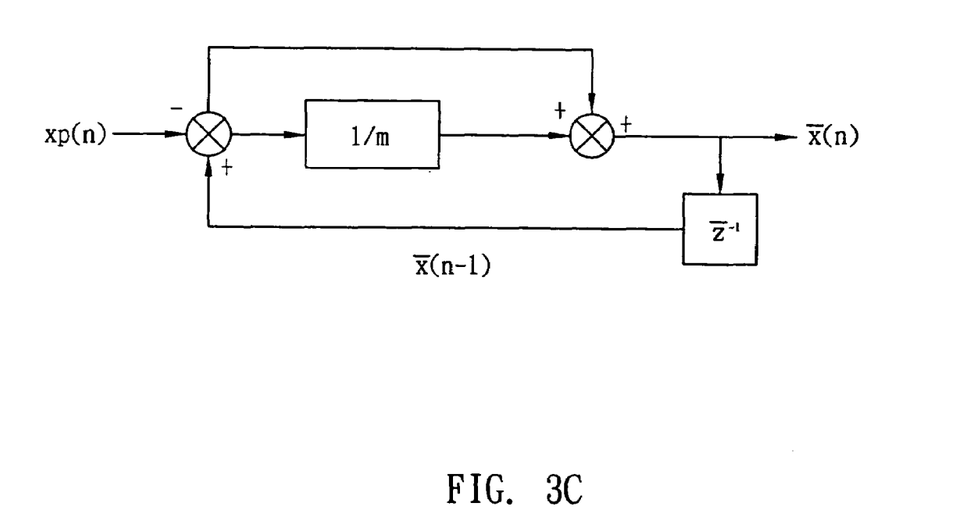

FIGS. 3A to 3C are schematic illustrations showing a practice of a recursive form sample mean method. The detailed embodiments shown in FIGS. 3A to 3C are different and can get the same result. The recursive form sample mean $\bar{x}(n)$ is:

$$\bar{x}(n) = \frac{m-1}{m} \times \bar{x}(n-1) + \frac{1}{m} xp(n), \quad n > 1 \tag{EQ-2}$$

$$\bar{x}(n) = xp(1) \quad n = 1 \tag{EQ-2a}$$

wherein, $\bar{x}(n-1)$ is the average of the previous one test channel, deterministic variable xp(n) is the default parameter of the current test channel which can be obtained based on the total mean of the history parameters in last lot of WLAN devices or any experience constant, and m is the total number of test channels. The equation EQ-1 can be deduced from the equation EQ-2.

Figure 4:
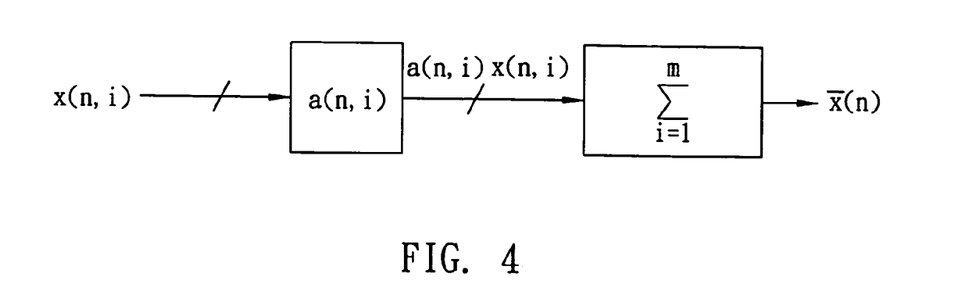
FIG. 4 is a schematic illustration showing a practice of a batch form optimum linear estimation method.

FIG. 4 is a schematic illustration showing a practice of a batch form optimum linear estimation method. The batch form optimum linear estimation value $\bar{x}(n)$ is:

$$\bar{x}(n) = \sum_{i=1}^{m} a(n, i) x(n, i) \tag{EQ-3}$$

Following the EQ-3, the mean square error of the parameters of the test channels can be minimized. In the EQ-3, m is the total number of test channels, i is the test channel, x(n, i) is the parameter of the test channel, and n is the current DUT.

Following shows EQ-4:

$$a(n, i) = \frac{1}{m + \frac{\sigma x(n)^2}{E[x(n)]^2}} \tag{EQ-4}$$

wherein, $\mu x(n) = E[x(n)]$, which is the total mean of the current test channels, is:

$$\mu x(n) = E[x(n)] = \sum_{i=1}^{n'} \frac{E[x(n, i)]}{n'} \tag{EQ-5}$$

wherein, E[x(n,i)] is the prediction of the parameter of the test channel in the current DUT, and n' is the total number the lot of WLAN devices. In the EQ-4, $\sigma x(n)^2$, which is the total variance of the current test channels, is:

$$\sigma x(n)^2 = \sum_{i=1}^{n'} [x(n, i) - E[x(n)]]^2 \tag{EQ-6}$$

Figure 5A:
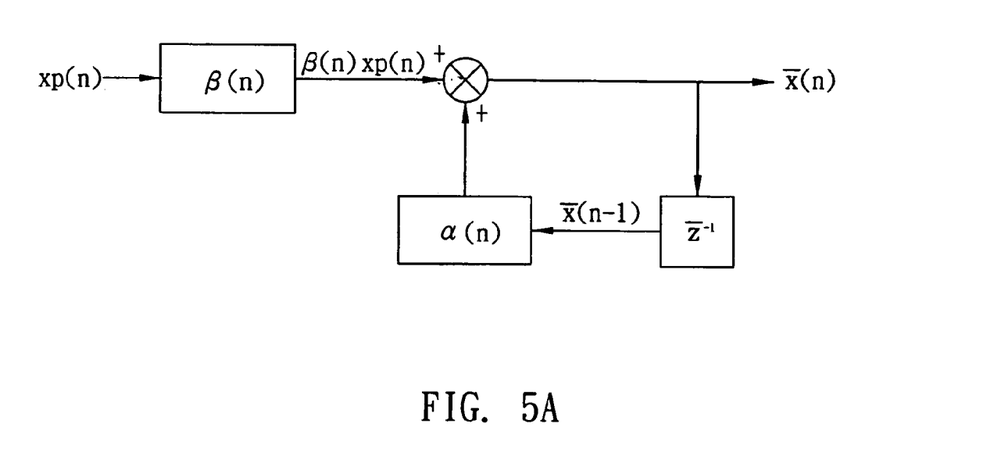
FIGS. 5A to 5C are schematic illustrations showing a practice of a recursive form optimum linear estimation method.
Figure 5B:
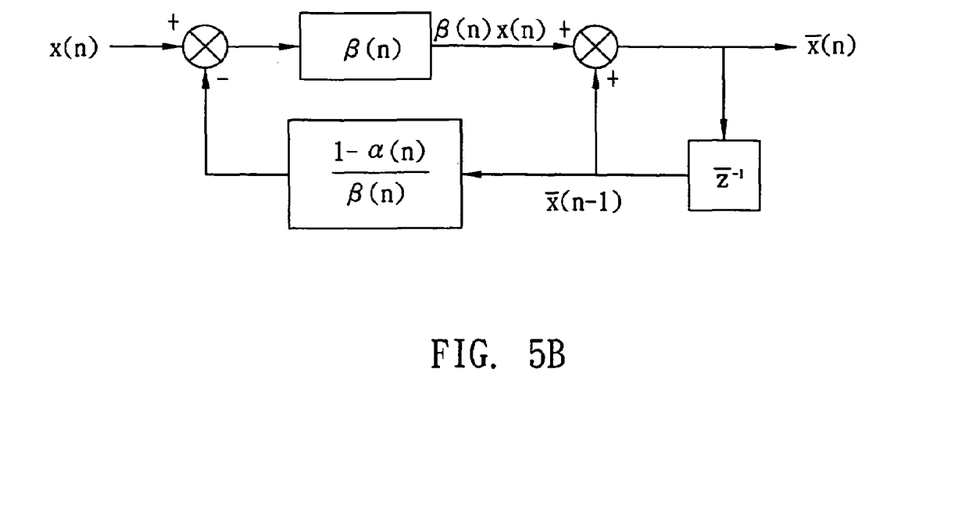
Figure 5C:
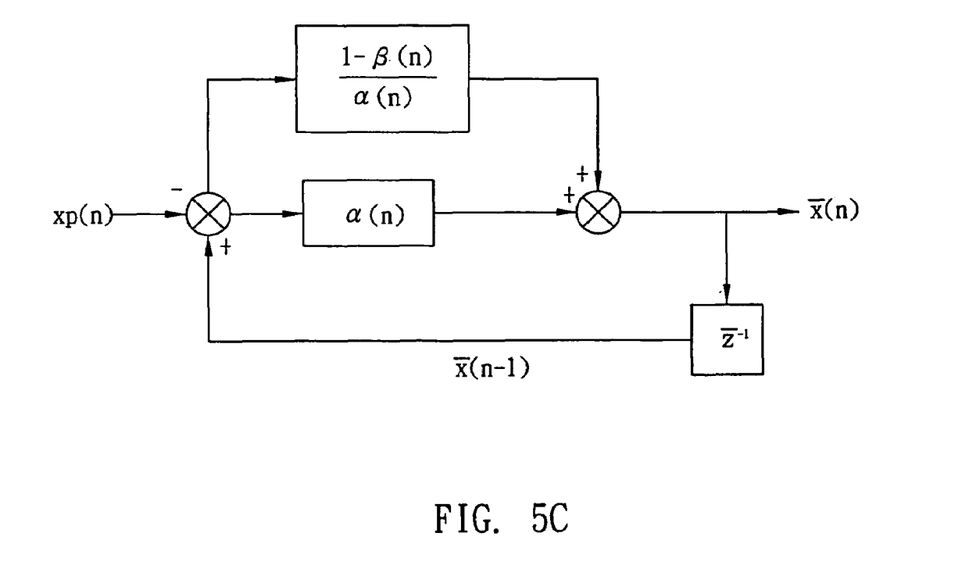

FIGS. 5A to 5C are schematic illustrations showing a practice of a recursive form optimum linear estimation method. The recursive form optimum linear estimation value $\bar{x}(n)$ is:

$$\bar{x}(n) = \alpha(n)\bar{x}(n-1) + \beta(n)xp(n) \quad n<1 \tag{EQ-5}$$

$$\bar{x}(n) = \beta(1)xp(1) \quad n=1 \tag{EQ-5a}$$

Following the EQ-5, the mean square error of the parameters of the test channels can be minimized. In the EQ-5, x̄(n−1) is the average of the previous one test channel, deterministic variable xp(n) is the default parameter of the current test channel, and:

$$\alpha(n) = 1 - \frac{\beta(n)E[x(n)]}{E[x(n)] + E[y(n)]} \quad \text{(EQ-6)}$$

$$= 1 - \frac{\beta(n)xp(n)}{(xp(n) + \mu y(n))} \quad n > 1$$

$$\beta(n) = \frac{(1-\alpha(n))(E[x(n)] + E[y(n)])}{E[x(n)]} \quad \text{(EQ-7)}$$

$$= \frac{(1-\alpha(n))(xp(n) + \mu y(n))}{xp(n)} \quad n > 1$$

$$\alpha(1) = 0 \quad \text{(EQ-8)}$$

$$\beta(1) = \frac{(xp(1) + \mu y(n))}{xp(1)} \quad \text{(EQ-9)}$$

wherein, μy(n)=E[y(n)]=x(n)−xp(n) is the tuning value to the prediction of the parameter. The tuned parameter is called parameter calibration value, and y(n) and x(n) are both stochastic processes.

Figure 6:
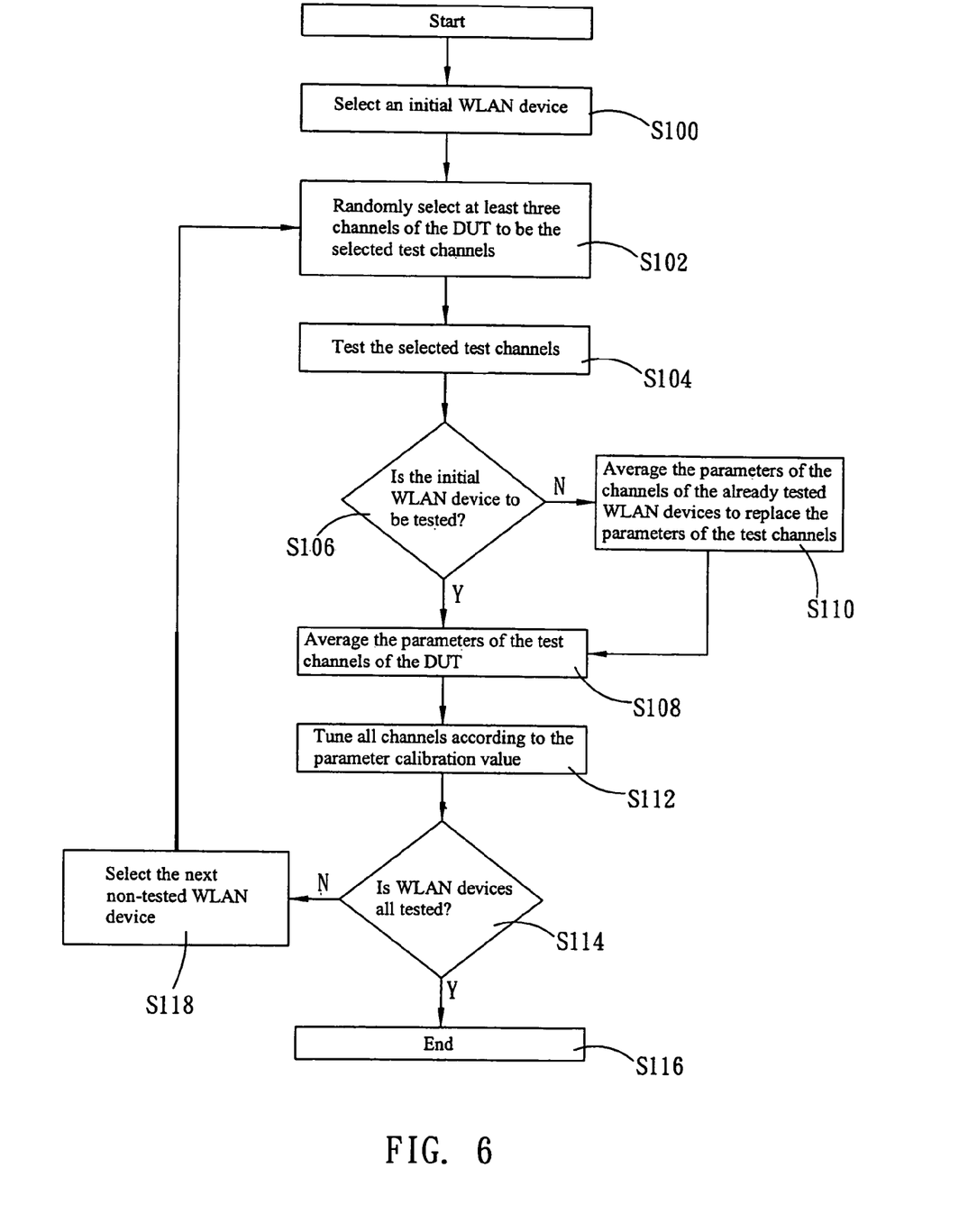
FIG. 6 is flow chart showing a method of a tuning process for WLAN devices according to a second embodiment of the invention.

FIG. 6 is flow chart showing a method of a tuning process for WLAN devices according to a second embodiment of the invention. According to FIGS. 2 to 5, there are four combinations of selecting one of the sample mean method and the optimum linear estimation method in cooperation with one of the batch method and the recursive method for carrying out the method of the tuning process for WLAN devices of the second embodiment. The difference between the first and second embodiments is in that the first embodiment is to test the fixed channels of each WLAN device after the step of randomly selecting at least three channels, and the second embodiment is to perform the randomly selecting step for each WLAN device.

Step S100 is to select an initial WLAN device from the WLAN devices to be the firstly tuned WLAN device. Then, several channels of the DUT are randomly selected to be the selected test channels, wherein the WLAN devices to be tested may have the same or different test channels (step S102). Step S104 is then performed to test the selected test channels to obtain the parameters of the test channels. Step S106 is to determine whether the DUT is the initial WLAN device or not. In other words, the step S106 is to determine whether the DUT is the first one to be tested in the lot of WLAN devices.

If the DUT is the initial WLAN device, the parameters of the test channels in the initial WLAN device are averaged to obtain a parameter calibration value for all channels of the initial WLAN device (step S108). In this embodiment, the step S108 can be processed by utilizing a batch method or a recursive method.

If the DUT is not the initial WLAN device, the parameters of the test channels in the already tested WLAN devices are averaged to obtain a parameter of the test channels (step S110). That is, after obtaining the parameters of the current test channels, the parameters of all already tested channels are averaged to generate a channel parameter mean to replace the parameter of the current test channel. For example, 27 WLAN devices of the lot are tested, and the channels No. 3, No. 9 and No. 11 are randomly selected to be the test channels. After testing the transmit-power and the corresponding EVM and sidelobe level of the test channel No. 3, the parameters of the test channels in all lady tested WLAN devices including the default parameter of the test channel No. 3 of the 27th WLAN device are averaged to obtain a parameter average for the test channel No. 3. The obtained parameter average for the test channel No. 3 is then used to replace the default parameter of the test channel No. 3 of the 27th WLAN device. Similarly, after testing the transmit-powers and the corresponding EVM and sidelobe levels of the test channels No. 9 and No. 11, the parameters of the test channels in all already tested WLAN devices are averaged to respectively obtain parameter averages for replacing the default parameters of the test channels No. 9 and No. 11. In this embodiment, the step S110 can be processed by utilizing a sample mean method or an optimum linear estimation method. After that, the step S108 is performed to average the parameters of test channels in the DUT. In other words, in each WLAN device, the parameters of the test channels are averaged to obtain the parameter calibration value for all channels in the DUT. Herein, the step S108 can be processed by utilizing a batch method or a recursive method.

Step S112 is then to tune the channels according to the parameter calibration value calculated in the step S110. Next, step S114 is to determine whether the lot of WLAN devices is all tested or not. If the lot of WLAN devices is all tested, the tuning process is ended (step S116).

If the lot of WLAN devices is not all tested, the next non-tested WLAN device is selected (step S118). After that, the step S102 to step S112 are repeated until all WLAN devices in the lot are tested.

In the step S108, the parameters of all already tested channels can be averaged by utilizing a sample mean method or an optimum linear estimation method. Herein, a reference number of WLAN devices are tested to obtain the parameters of the test channels. After the step S108, the calculating result obtained by the sample mean method or the optimum linear estimation method can directly represent the parameters of the channels in different WLAN devices.

Figure 7:
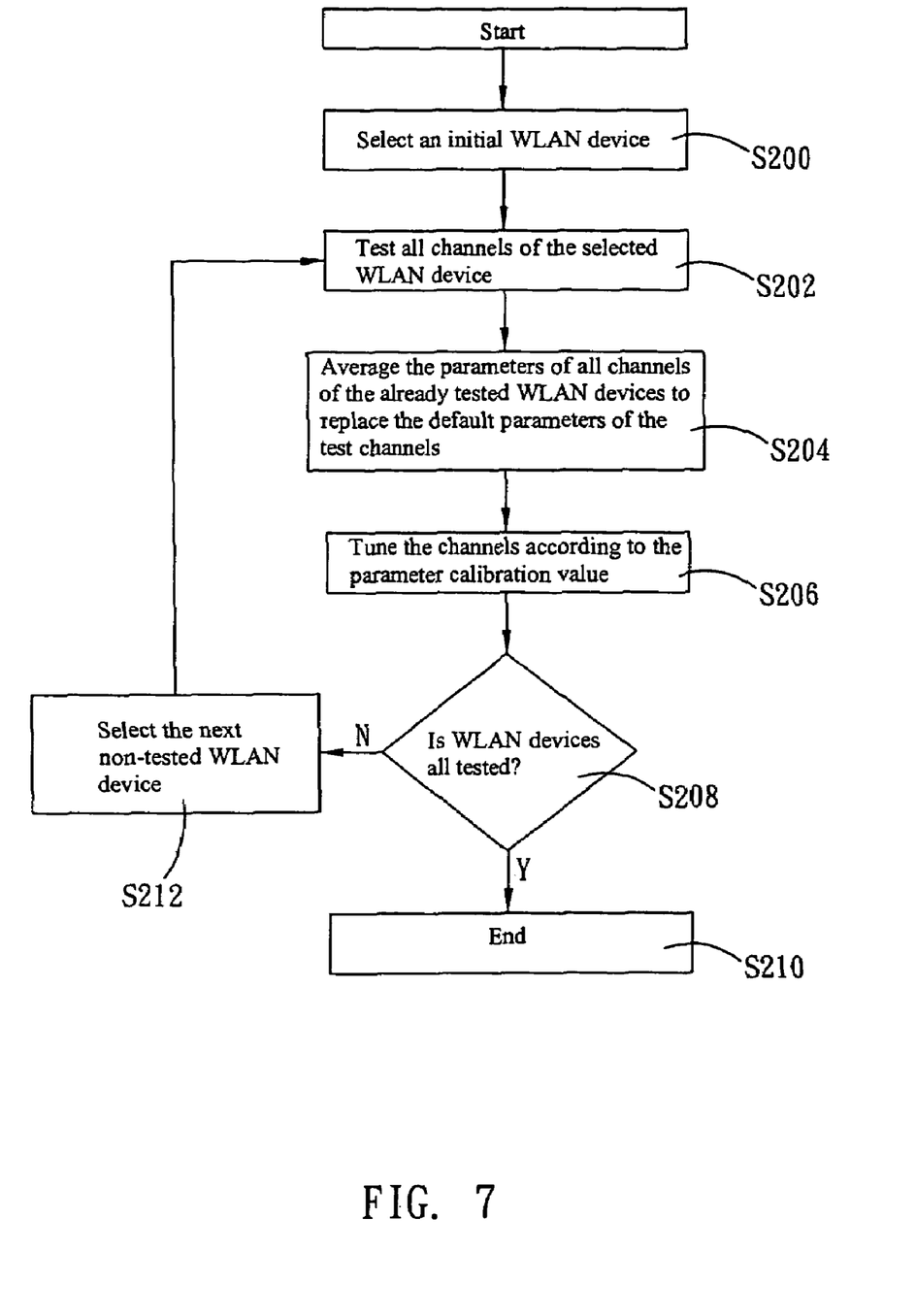
FIG. 7 is flow chart showing a method of a tuning process for WLAN devices according to a third embodiment of the invention.

FIG. 7 is flow chart showing a method of a tuning process for WLAN devices according to a third embodiment of the invention. The first and second embodiments of the invention are both to test the WLAN devices with the randomly selecting step, and the third embodiment of the invention is to test all channels of one WLAN device with utilizing the sample mean method or the optimum linear estimation method.

Step S200 is to select an initial WLAN device from the WLAN devices to be the firstly tuned WLAN device. Then, all channels of the selected WLAN device are tested to obtain the parameters of the channels (step S202). Before testing all channels of the selected WLAN device, a reference number of WLAN devices in the lot may be selected for the test. In the embodiment, the reference number is usually decades. Alternatively, all WLAN devices in the lot may be selected for the test.

In the current DUT, the average of the parameters of all tested channels can replace the default parameter of the test channel (step S204). In other words, after testing a current test channel to get the corresponding parameter, the parameters of all tested channels are averaged to obtain a channel average, which is used to replace the default parameter of the current test channel and to be the parameter calibration value of the current test channel. For example, 27 WLAN devices of the lot are tested, and all channels of the 27th WLAN device are selected to be the test channels. After testing the transmit-power and the corresponding EVM and sidelobe level of the test channel No. 1, the parameters of the test channels in all already tested WLAN devices including the default parameter of the test channel No. 1 of the 27th WLAN device are averaged to obtain a parameter average for the test channel No. 1. The obtained parameter average for the test channel No. 1 is then used to replace the default parameter of the test channel No. 1 of the 27th WLAN device. Similarly, after testing all test channels of the 27th WLAN device, the parameters of the test channels in all already tested WLAN devices are averaged to respectively obtain parameter averages for replacing the default parameters of the channels in the 27th WLAN device. In this embodiment, the step S204 can be processed by utilizing a sample mean method or an optimum linear estimation method.

Step S206 is then to tune the channels according to the parameter calibration value calculated in the step S204. Next, step S208 is to determine whether the lot of WLAN devices is all tested or not. If the lot of WLAN devices is all tested, the tuning process is ended (step S210).

If the lot of WLAN devices is not all tested, the next non-tested WLAN device is selected (step S212). After that, the step S202 to step S206 are repeated until all WLAN devices in the lot are tested.

In the step S204, the parameters of all already tested channels can be averaged by utilizing a sample mean method or an optimum linear estimation method. In this embodiment, all channels of each WLAN device are tested, and the parameters are averaged by utilizing the sample mean method or the optimum linear estimation method to obtain the parameter average for replacing the default parameter of the test channels and serving as the parameter calibration value of the test channels. In a reference number of WLAN devices, after testing the channels to obtain the parameters, the calculating result obtained by the sample mean method or the optimum linear estimation method can directly represent the parameters of the channels in different WLAN devices.

In the method of the tuning process for the WLAN devices of the above mentioned three embodiments, a computer can be used to perform the averaging step with the sample mean method or the optimum linear estimation method, so that the testing time can be reduced. The computer can also record the calculation results for the testing operator's references. Accordingly, the operator can further tune or design the future WLAN devices. Besides, the calculation results can be transferred to the order customers through the network so as to ensure the accuracy of the test.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of a tuning process for a lot of WLAN devices, comprising the steps of:

randomly selecting at least three channels out of all channels of one of the WLAN devices, wherein the selected channels comprises a first channel, a second channel and a third channel, and the first channel, the second channel and the third channel serve as test channels for each of the WLAN devices;

testing the first channel, the second channel, and the third channel of an initial WLAN device selected from the WLAN devices to be an initially tuned WLAN device so as to obtain corresponding parameters, wherein an average of the parameters corresponding to the first channel, the second channel, and the third channel of the initial WLAN device serves as a parameter calibration value for tuning all of the channels of the initial WLAN device;

tuning all of the channels of the initial WLAN device according to the parameter calibration value of the initial WLAN device; and selecting non-tested WLAN devices out of the WLAN devices one by one for executing the tuning process, wherein the tuning process comprises the steps of:

respectively averaging the parameters of the first channels of all already tested WLAN devices, the parameters of the second channels of all already tested WLAN devices, and the parameters of the third channels of all already tested WLAN devices to respectively generate a first channel average, a second channel average, and a third channel average for a current DUT (device under test), averaging the first channel average, the second channel average, and the third channel average to obtain a parameter calibration value for tuning all of the channels of the current DUT, tuning all of the channels of the current DUT according to the parameter calibration value of the current DUT, and determining whether all of the lot of the WLAN devices are tuned, wherein if all of the lot of the WLAN devices are tuned, the tuning process is ended.

2. The method of claim 1, wherein the step of selecting non-tested WLAN devices of the WLAN devices one by one for executing the tuning process is to select at least a reference number of the WLAN devices for executing the tuning process.

3. The method of claim 1, wherein the step of respectively averaging the parameters of the first channels of all already tested WLAN devices, the parameters of the second channels of all already tested WLAN devices, and the parameters of the third channels of all already tested WLAN devices comprises:

respectively averaging the parameters of the first channels of all already tested WLAN devices, the parameters of the second channels of all already tested WLAN devices, and the parameters of the third channels of all already tested WLAN devices by utilizing a sample mean method.

4. The method of claim 1, wherein the step of respectively averaging the parameters of the first channels of all already tested WLAN devices, the parameters of the second channels of all already tested WLAN devices, and the parameters of the third channels of all already tested WLAN devices comprises:

respectively averaging the parameters of the first channels of all already tested WLAN devices, the parameters of the second channels of all already tested WLAN devices, and the parameters of the third channels of all already tested WLAN devices by utilizing an optimum linear estimation method.

5. The method of claim 1, wherein the average of the parameters corresponding to the first channel, the second channel, and the third channel of the initial WLAN device is obtained by utilizing a batch method.

6. The method of claim 1, wherein the average of the parameters corresponding to the first channel, the second channel, and the third channel of the initial WLAN device is obtained by utilizing a recursive method.

7. The method of claim 1, wherein the step of averaging the first channel average, the second channel average, and the third channel average comprises:

averaging the first channel average, the second channel average, and the third channel average by utilizing a batch method.

8. The method of claim 1, wherein the step of averaging the first channel average, the second channel average, and the third channel average comprises:
averaging the first channel average, the second channel average, and the third channel average by utilizing a recursive method.

9. The method of claim 1, wherein the step of respectively averaging the parameters of the first channels of all already tested WLAN devices, the parameters of the second channels of all already tested WLAN devices, and the parameters of the third channels of all already tested WLAN devices comprises:
respectively averaging transmit-power setting parameters of the first channels of all already tested WLAN devices, transmit-power setting parameters of the second channels of all already tested WLAN devices, and transmit-power setting parameters of the third channels of all already tested WLAN devices.

10. The method of claim 1, wherein the step of respectively averaging the parameters of the first channels of all already tested WLAN devices, the parameters of the second channels of all already tested WLAN devices, and the parameters of the third channels of all already tested WLAN devices comprises:
respectively averaging receive-power setting parameters of the first channels of all already tested WLAN devices, receive-power setting parameters of the second channels of all already tested WLAN devices, and receive-power setting parameters of the third channels of all already tested WLAN devices.

11. A method of a tuning process for a lot of WLAN devices, comprising the steps of:
randomly selecting at least three channels out of all channels of an initial WLAN device selected from the WLAN devices to be an initially tuned WLAN device;
testing the randomly selected channels of the initial WLAN device to obtain corresponding parameters, wherein an average of the parameters corresponding to the randomly selected channels of the initial WLAN device serves as a parameter calibration value for tuning all of the channels of the initial WLAN device;
tuning all of the channels of the initial WLAN device according to the parameter calibration value of the initial WLAN device; and
selecting non-tested WLAN devices of the WLAN devices one by one for executing the tuning process, wherein the tuning process comprises the steps of:
randomly selecting at least three channels out of all channels of a current DUT, wherein the randomly selected channels serve as already selected test channels,
testing the already selected test channels one by one to obtain parameters corresponding to the already selected test channels, wherein parameters for test channels of all already tested WLAN devices of the WLAN devices are averaged to obtain parameter averages for the already selected test channels,
averaging the parameter averages for all of the already selected test channels by the current DUT so as to obtain a parameter calibration value for tuning all of the channels of the current DUT,
tuning all of the channels of the current DUT according to the parameter calibration value of the current DUT, and
determining whether all of the lot of the WLAN devices are tuned, wherein if all of the lot of the WLAN devices are tuned, the tuning process is ended.

12. The method of claim 11, wherein the step of selecting non-tested WLAN devices of the WLAN devices one by one for executing the tuning process is to select at least a reference amount of the WLAN devices for the tuning process.

13. The method of claim 11, wherein the parameters of the test channels of all of the already tested WLAN devices of the WLAN devices are averaged by utilizing a sample mean method to obtain the parameter averages for the already selected test channels.

14. The method of claim 11, wherein the parameters of the test channels of all of the already tested WLAN devices of the WLAN devices are averaged by utilizing an optimum linear estimation method to obtain the parameter averages for the already selected test channels.

15. The method of claim 11, wherein the average of the parameters corresponding to the randomly selected channels of the initial WLAN device is obtained by utilizing a batch method.

16. The method of claim 11, wherein the average of the parameters corresponding to the randomly selected channels of the initial WLAN device is obtained by utilizing a recursive form method.

17. The method of claim 11, wherein the step of averaging the parameter averages for all of the already selected test channels comprises:
averaging the parameter averages for all of the already selected test channels by utilizing a batch method.

18. The method of claim 11, wherein the step of averaging the parameter averages for all of the already selected test channels comprises:
averaging the parameter averages for all of the already selected test channels by utilizing a recursive form method.

19. The method of claim 11, wherein the step of testing the already selected test channels one by one to obtain the parameters corresponding to the already selected test channels comprises:
testing the already selected test channels one by one to obtain transmit-power setting parameters corresponding to the already selected test channels.

20. The method of claim 11, wherein the step of testing the already selected test channels one by one to obtain the parameters corresponding to the already selected test channels comprises:
testing the already selected test channels one by one to obtain receive-power setting parameters corresponding to the already selected test channels.

21. A method of a tuning process for a lot of WLAN devices, comprising the steps of:
selecting at least a reference number of the lot of the WLAN devices for testing; and
testing all channels of a current DUT in sequence; and
executing the tuning process for a current test channel in the current DUT, wherein the tuning process comprises the steps of:
testing the current test channel to obtain a parameter corresponding to the current test channel,
averaging parameters of all already tested channels to obtain a parameter calibration value of the current DUT, wherein the parameters comprises the parameter corresponding to the current test channel,
tuning all channels of the current DUT according to the parameter calibration value of the current DUT, and
determining whether all of the lot of the WLAN devices are tuned, wherein if all of the lot of the WLAN devices are tuned, the tuning process is ended.

22. The method of claim 21, wherein the step of averaging the parameters of all of the already tested channels comprises:

averaging the parameters of all of the already tested channels by utilizing a sample mean method.

23. The method of claim 21, wherein the step of averaging the parameters of all of the already tested channels comprises:
averaging the parameters of all of the already tested channels by utilizing an optimum linear estimation method.

24. The method of claim 21, wherein the step of testing the current test channel to obtain the parameter corresponding to the current test channel comprises:
testing the current channel to obtain a transmit-power setting parameter corresponding to the current test channel.

25. The method of claim 21, wherein the step of testing the current test channel to obtain the parameter corresponding to the current test channel comprises:
testing the current channel to obtain a receive-power setting parameter corresponding to the current test channel.

* * * * *